(12) United States Patent
AlSahan

(10) Patent No.: US 10,557,564 B2
(45) Date of Patent: Feb. 11, 2020

(54) LOCALLY-ACTUATED PARTIAL STROKE TESTING SYSTEM

(71) Applicant: Saudi Arabian Oil Company, Dhahran (SA)

(72) Inventor: Fawaz A. AlSahan, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 102 days.

(21) Appl. No.: 15/400,980

(22) Filed: Jan. 7, 2017

(65) Prior Publication Data

US 2018/0195637 A1 Jul. 12, 2018

(51) Int. Cl.
*F16K 37/00* (2006.01)

(52) U.S. Cl.
CPC .................. *F16K 37/0083* (2013.01)

(58) Field of Classification Search
CPC ............ F16K 37/0075; F16K 37/0083; F15B 2211/855; F15B 2211/8855
USPC ...................................... 73/1.72, 168, 865.9
See application file for complete search history.

(56) References Cited

U.S. PATENT DOCUMENTS

| | | | |
|---|---|---|---|
| 4,637,587 A | 1/1987 | Kuhnlein | |
| 6,089,269 A | 7/2000 | Essam | |
| 6,131,609 A | 10/2000 | Metso et al. | |
| 6,186,167 B1 | 2/2001 | Grumstrup | |
| 6,435,022 B1 | 8/2002 | Albuaijan | |
| 6,631,882 B2 | 10/2003 | Mack | |
| 6,862,547 B2 | 3/2005 | Snowbarger | |
| 6,920,409 B2 | 7/2005 | Essam | |
| 7,079,021 B2 | 7/2006 | Snowbarger | |
| 7,584,643 B2 | 9/2009 | Hoffman | |
| 7,828,008 B1 | 11/2010 | Beckman | |
| 8,056,390 B2 | 11/2011 | Filkovski | |
| 8,072,343 B2 | 12/2011 | Flanders | |
| 8,074,512 B2 | 12/2011 | Al-Buaijan | |
| 8,262,060 B2 | 9/2012 | Heer | |
| 8,413,499 B2 | 4/2013 | Welker | |
| 8,540,211 B2 | 9/2013 | Wheater | |
| 8,814,133 B2 | 8/2014 | Li | |
| 2003/0062494 A1 | 4/2003 | Snowbarger | |
| 2010/0089473 A1 | 4/2010 | Grein | |
| 2010/0187456 A1 | 7/2010 | Heer et al. | |

(Continued)

FOREIGN PATENT DOCUMENTS

| CN | 102182864 A | 9/2011 |
|---|---|---|
| CN | 103411024 A | 11/2013 |

(Continued)

OTHER PUBLICATIONS

International Search Report and Written Opinion dated Apr. 20, 2018 for corresponding PCT/US2018/012456 International Search Report and Written Opinion dated Apr. 20, 2018 for corresponding PCT/US2018/012456.

(Continued)

*Primary Examiner* — Benjamin R Schmitt
(74) *Attorney, Agent, or Firm* — Bracewell LLP; Constance G. Rhebergen; Linda L. Morgan

(57) ABSTRACT

Embodiments of the present disclosure describe both mechanically-operated and electrically-operated, locally-actuated partial stroke testing devices and systems for testing operation of an emergency isolation valve.

11 Claims, 4 Drawing Sheets

(56) References Cited

U.S. PATENT DOCUMENTS

| | | | |
|---|---|---|---|
| 2011/0054828 A1* | 3/2011 | Junk | ............ G05B 23/0256 |
| | | | 702/125 |
| 2012/0310582 A1 | 12/2012 | Al-Buaijan | |
| 2015/0323936 A1 | 11/2015 | Junk | |

FOREIGN PATENT DOCUMENTS

| | | |
|---|---|---|
| CN | 104019278 A | 9/2014 |
| DE | 102012021462 A1 | 4/2014 |
| DE | 102013107172 B3 | 11/2014 |
| FR | 3038032 A1 | 12/2016 |
| KR | 101186202 B1 | 10/2012 |
| WO | 01/59346 A1 | 8/2001 |

OTHER PUBLICATIONS

Val Controls: "MTControl by Val Controls", Aug. 22, 2013 (Aug. 22, 2013), XP054978252, URL:https://www.youtube.com/watch?v=KvhYaz Val Controls: "MTControl by Val Controls", Aug. 22, 2013 (Aug. 22, 2013), XP054978252, URL: https://WWW.youtube.com/watch?v=KvhYaz.

* cited by examiner

US 10,557,564 B2

LOCALLY-ACTUATED PARTIAL STROKE TESTING SYSTEM

FIELD

The disclosure relates to a locally-actuated partial stroke testing system for testing operation of emergency isolation valves.

BACKGROUND

Partial stroke testing (PST) is a method used in a process control system to allow testing of a selected percentage of possible failure modes of an emergency isolation valve (EIV) without completely physically closing the valve. Generally, PST is performed via a computer control system where the system communicates with an EIV to partially close the valve and then open the valve. The purpose of PST is to determine whether an EIV is operating properly to ensure safe operation of an industrial process in the event that an emergency requires closing of the EIV. PST is common in the oil, gas, petrochemical, and power industries, and numerous computer based control systems with PST capability.

Generally, computer based PST systems are operated remotely and have relatively complicated designs, including complex wiring, multiple input/output lines, voluminous documentation, full stroke/complex calibration, and numerous design components such as boosters. Furthermore, some computer based PST systems may be sensitive to air quality, and online replacement may not be an option due to requirements of full stroke for accurate positioner calibration. Moreover, some systems may have continuous air consumption and power consumption during operation and further may have additional height requirements to a valve thus requiring more space for installation.

SUMMARY

Certain specific embodiments of this disclosure have been described in great detail here. In an effort to provide a concise description of these embodiments, all features of an actual implementation may not be described in the specification. In the development of any such actual implementation, as in any engineering or design project, numerous implementation-specific changes may be made to achieve specific goals, such as compliance with system-related and business-related constraints, which may vary from one implementation to another. Such a development effort might be complex and time consuming, but nevertheless it would be a routine undertaking of design, fabrication, and manufacture for those of ordinary skill having the benefit of this disclosure.

Certain embodiments include a locally-actuated partial stroke testing device for testing a single acting emergency isolation valve. The device includes a mechanically-operated valve; a flow control valve coupled to a vent port of the mechanically-operated valve, the flow control valve being operable to regulate air flow from the vent port; and a valve position indicator to convey position of the single acting emergency isolation valve, the valve position indicator being in visual proximity to the mechanically-operated valve.

The flow control valve can be integrated to the vent port of the mechanically-operated valve. The mechanically-operated valve can be a 3/2 manually-operated valve. The mechanically-operated valve can be a 5/2 manually-operated valve. Certain embodiments may further include an air supply line coupled to an input port of the mechanically-operated valve, the air supply line having an air filter regulator to filter and regulate air supplied to the input port; a 3/2 solenoid valve with a first port coupled via an air flow line to a working port of the mechanically-operated valve; and a working flow line coupled between a second port of the 3/2 solenoid valve and a port of the single acting emergency isolation valve, the working flow line to provide bidirectional air flow.

Certain embodiments include a locally-actuated partial stroke testing device for testing a double acting emergency isolation valve. The device includes a mechanically-operated valve with a first vent port, a second vent port, a first working port, and a second working port, wherein the first and second vent ports are operable to vent air from the mechanically-operated valve, and the first working port is coupled to a first flow control valve and the second working port is operable to regulate the air flow to a first solenoid valve coupled to the double acting emergency isolation valve. This device also includes the first flow control valve operable to regulate the air flow to a second solenoid valve coupled to the double acting emergency isolation valve; and a second flow control valve coupled to the first vent port of the mechanically-operated valve, the second flow control valve being operable to regulate air flow; and a valve position indicator to convey position of the double acting emergency isolation valve, the valve position indicator being in visual proximity to the mechanically-operated valve. The mechanically-operated valve can be a 3/2 manually-operated valve. The mechanically-operated valve can be a 5/2 manually-operated valve. The first flow control valve can be integrated with the first working port of the mechanically-operated valve. The second flow control valve can be integrated with the first vent port of the mechanically-operated valve.

Certain embodiments include an electrically-operated, locally-actuated partial stroke testing device for testing a single acting emergency isolation valve. The device includes a 3/2 solenoid valve coupled to an electrical actuator; a flow control valve coupled to a vent port of the 3/2 solenoid valve, the flow control valve being operable to regulate air flow; and a valve position indicator to convey position of the single acting emergency isolation valve, the valve position indicator being in visual proximity to the 3/2 solenoid valve.

Certain embodiments of the device further include an air supply line coupled to an input port of the 3/2 solenoid valve, the air supply line including an air filter regulator to filter and regulate air supplied to the input port; a second 3/2 solenoid valve with a first port coupled via an air flow line to a working port of the first 3/2 solenoid valve, the second 3/2 solenoid valve being a universal type 3/2 solenoid valve with an exhaust port; and a working flow line coupled between a second port of the second 3/2 solenoid valve and a port of a single acting emergency isolation valve, the working flow line to provide bidirectional air flow. In certain embodiments, the flow control valve is integrated with the vent port of the 3/2 solenoid valve. The electrical actuator can include a partial stroke testing limit switching circuit.

Certain embodiments include a locally-actuated partial stroke testing device for testing a double acting emergency isolation valve. The device includes a first solenoid valve with an electrical actuator, a first vent port, a second vent port, a first working port, and a second working port, wherein the first and second vent ports is operable to vent air from the first solenoid valve, and the first working port is coupled to a first flow control valve and the second working port is operable to regulate the air flow to a second solenoid valve coupled to the double acting emergency isolation valve. The device further includes the first flow control valve operable to regulate the air flow to a third solenoid valve coupled to the double acting emergency isolation valve; a second flow control valve coupled to the first vent port of the first solenoid valve, the second flow control valve being operable to regulate air flow; a valve position indicator to convey position of the double acting emergency isolation valve, the valve position indicator being in visual proximity to the first solenoid valve. The first flow control valve can be integrated with the first working port of the first solenoid valve. The second flow control valve can be integrated with the first vent port of the first solenoid valve. In certain embodiments, the device further includes a partial stroke testing limit switching circuit. The valve position indicator can convey a percentage of diameter of the double acting emergency isolation valve open to fluid flow. The valve position indicator can utilize one or more of color, numerical, alphabetical, or graphical marks or combinations thereof to convey the percentage of diameter of the double acting emergency isolation valve open to fluid flow.

BRIEF DESCRIPTION OF THE DRAWINGS

Embodiments will be readily understood by a person having ordinary skill in the art by reading the detailed description in conjunction with the accompanying drawings. To facilitate the description, like reference numerals designate like structural elements or procedures in a method. Embodiments may be illustrated by way of examples and drawings.

DETAILED DESCRIPTION

Figure 1:
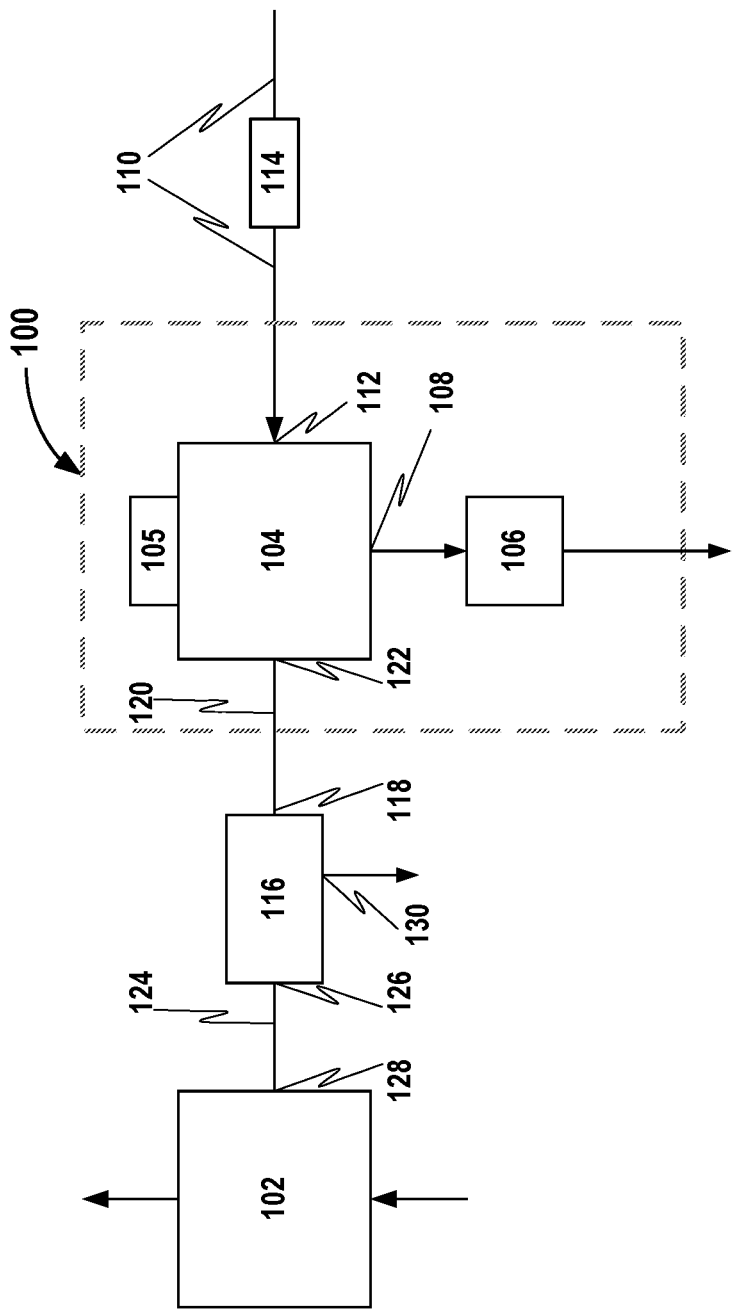
FIG. 1 schematically illustrates a mechanically-operated, locally-actuated partial stroke testing device for testing a single acting emergency isolation valve, in accordance with various embodiments.

The present disclosure describes various embodiments related to locally-actuated partial stroke testing systems for testing operation of emergency shutdown valves. Further embodiments may be described and disclosed.

In the following description, numerous details are set forth in order to provide a thorough understanding of the various embodiments. In other instances, well-known processes, devices, and systems may not been described in particular detail in order not to unnecessarily obscure the various embodiments. Additionally, illustrations of the various embodiments may omit certain features or details in order to not obscure the various embodiments.

In the following detailed description, reference is made to the accompanying drawings that form a part of this disclosure. Like numerals may designate like parts throughout the drawings. The drawings may provide an illustration of some of the various embodiments in which the subject matter of the present disclosure may be practiced. Other embodiments may be utilized, and logical changes may be made without departing from the scope of this disclosure.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

Various embodiments of locally-actuated partial stroke testing (PST) devices and methods are disclosed and described. The various embodiments provide devices and methods that are intrinsically safe, simple in design and operation, and economic, in comparison to various commercial PST devices and systems. The PST may be locally-actuated (LAPST) and may be used for testing single acting or double acting emergency isolation valves. The PST may be locally-actuated by mechanical-based methods or electrical-based methods. In the mechanically-based PST method and system, a mechanically operated valve may be used in the PST method. Some of the mechanical-based devices and methods may involve manual operation of a mechanical valve to perform PST. The valve may include any type of mechanical device to operate the valve. The valve is to divert air to and from the actuator. The system may further include a unidirectional flow control valve for a single acting actuator. The valve may be a 3/2 type for a single acting actuator. The system may further include two unidirectional flow control valves for double acting actuators. The valve may be a 5/2 type for a double acting actuator. The unidirectional flow control valve may provide full bore flow in one direction and a restricted flow in the opposite direction. The unidirectional flow control valve is to slow down the rate of pressurizing and venting of air from the actuator in the direction of the restricted flow (away from the valve). Isolation and bypass valves may be included in the PST system to provide a mechanism for online replacement and isolation of the PST system, and a limit switch at the intended stroke test position may be included in the PST system to set a selected percentage to provide an alarm. Some of the various embodiments may be electrical-based devices with push button operation of a solenoid valve to perform PST. The various embodiments do not need an interface with an emergency shutdown system (logic solver) as they are locally-actuated near the valve being tested. The various embodiments may be used for fail-open, fail-close, single acting, and double acting actuators. The various embodiments include locally actuating a partial stroke testing by pressing a button or moving a lever or key while visually monitoring the valve movement via a local valve position indicator on the valve being tested. In various embodiments, a partial stroke testing will finish when the target position of the valve is reached, at which point the testing button/lever/key is released to allow the valve to return to its original position prior to initiation of PST. In various embodiments, the display device and the valve position indicator are in visual proximity to the locally-actuated partial stroke testing device. In various embodiments, a display device may be mounted on a panel next to the valve to ease viewing the local valve position indicator during the testing. The display devices can include indicators that show the "open" or "close" positions of the valve along with the percentage of "open" or "close" position of the valve. These indicators can include color, numerical, alphabetical, or graphical marks or combinations of these marks to show the valve position. In certain embodiments, the valve position indicator conveys a percentage of diameter of the double acting emergency isolation valve open to fluid flow. In certain embodiments, the valve position indicator utilizes one or more of color, numerical, alphabetical, or graphical marks or combinations thereof to convey the percentage of diameter of the double acting emergency isolation valve open to fluid flow.

FIG. 1 schematically illustrates a mechanically-operated, locally-actuated partial stroke testing device 100 for testing a single acting emergency isolation valve 102, in accordance with various embodiments. The device 100 includes a mechanically-operated valve 104. The mechanically-operated valve 104 can be a 3/2 or 5/2 hand operated valve. The device 100 further includes a flow control valve 106 coupled to a vent port 108 of the mechanically-operated valve 104. An air supply line 110 is used to provide air to an input port 112 of the mechanically-operated valve 104. The air supply line 110 can incorporate an air filter regulator 114 to filter and regulate air supplied to the input port 112. The device 100 includes a mechanical device 105 such as a push button or lever or key to operate the mechanically-operated valve 104. The device 100 is locally-actuated via device 105 in contrast to remotely actuated via a computer logic controller system. A display device may be mounted on a panel next to the emergency isolation valve 102 for easy viewing of the valve position indicator during the testing. The device 100 further is coupled via an air flow line 120 to a 3/2 solenoid valve 116, such as a SIL 3 solenoid valve, with a first port 118. The air flow line 120 connects a working port 122 of the hand operated valve 104 to the first port 118 of the solenoid valve 116. In this embodiment, the working flow line 124 establishes a connection between a second port 126 of the solenoid valve 116 and a port 128 of a single acting emergency isolation valve 102. The working flow line 124 provides bidirectional air flow. The flow control valve 106 restricts air flow from the vent port 108 of the hand operated valve 104 in a direction 109 away from the valve 104. In this embodiment, the 3/2 solenoid valve 116 is a universal type normally energized 3/2 solenoid valve. In other embodiments, the flow control valve 106 may be integrated within the vent port 108 of the valve 104. The valve 104 may be manufactured with the flow control valve 106 as a design element of the valve 104 to provide an integrated valve with a flow controller. In various embodiments, the 3/2 solenoid valve 116 further contains an exhaust port 130. Flow through the 3/2 solenoid valve 116 is bidirectional, with the direction depending on progression of a PST of valve 102.

Figure 2:
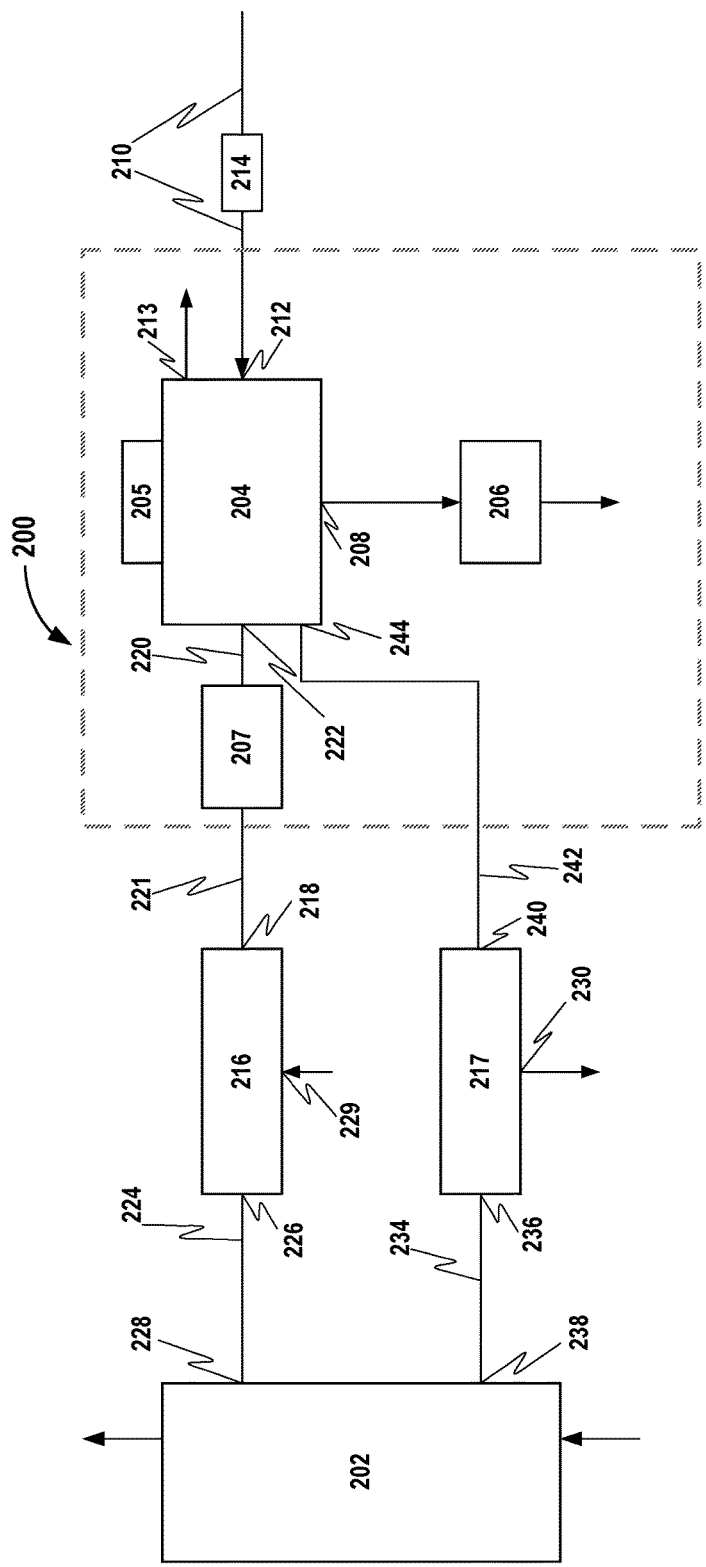
FIG. 2 schematically illustrates a mechanically-operated, locally-actuated partial stroke testing device for testing a double acting emergency isolation valves, in accordance with various embodiments.

FIG. 2 schematically illustrates a mechanically-operated, locally-actuated partial stroke testing device 200 for testing a double acting emergency isolation valve 202, in accordance with various embodiments. The device 200 includes a 5/2 mechanically-operated valve 204 with a first vent port 208 and a second vent port 213, where the first vent port 208 and second vent port 213 are used to vent air from the 5/2 mechanically-operated valve 204 to shut-off valves. The device 200 further includes a first flow control valve 206 coupled to the first vent port 208 of the 5/2 mechanically-operated valve 204. The flow control valve 206 is used to restrict or allow air flow from the first vent port 208. An air supply line 210 is used to provide air to an input port 212 of the 5/2 mechanically-operated valve 204. The air supply line 210 can include an air filter regulator 214 to filter and regulate air. A first 3/2 solenoid valve 216 with a first port 218 is coupled via a first working line 220 to a first working port 222 of the 5/2 mechanically-operated valve 204. The first 3/2 solenoid valve 216 can be a universal type normally energized 3/2 solenoid valve and includes an air inlet port 229. The first working port 222 is operably coupleable to the second vent port 213 via positioning of a mechanical device 205 of the 5/2 mechanically-operated valve 204. The mechanical device 205 may be a lever or push button or key or some other type of mechanical device for operation of the 5/2 mechanically-operated valve 204. The device 200 can include a second flow control valve 207 operating on the first working line 220 between the first working port 222 of the 5/2 mechanically-operated valve 204 and the first port 218 of the first 3/2 solenoid valve 216. The second flow control valve 207 is used to restrict or allow air from first working port 222. A second working flow line 224 connects a second port 226 of the first 3/2 solenoid valve 216 with a first port 228 of a double acting emergency isolation valve 202. A second 3/2 solenoid valve 217 with a first port 240 is coupled to the device 200 via a third working line 242 to a second working port 244 of the 5/2 mechanically-operated valve 204. In certain embodiments, the second 3/2 solenoid valve 217 is a universal type normally energized 3/2 solenoid valve and includes an exhaust port 230. The second working port 244 is operably coupleable to the first vent port 208 of the 5/2 mechanically-operated valve via positioning of a mechanical device 205. A fourth working flow line 234 connects a second port 236 of the second 3/2 solenoid valve 217 and a second port 238 of the double acting emergency isolation valve 202. The device 200 can further include the first flow control valve 206 integrated with the first vent port 208 of the 5/2 mechanically-operated valve 204. The valve 204 may be manufactured with the flow control valve 206 as a design element of the valve 204 to provide an integrated valve with a flow controller. The device 200 can further include the second flow control valve 207 integrated with the first working port 222 of the 5/2 mechanically-operated valve 204.

Figure 3:
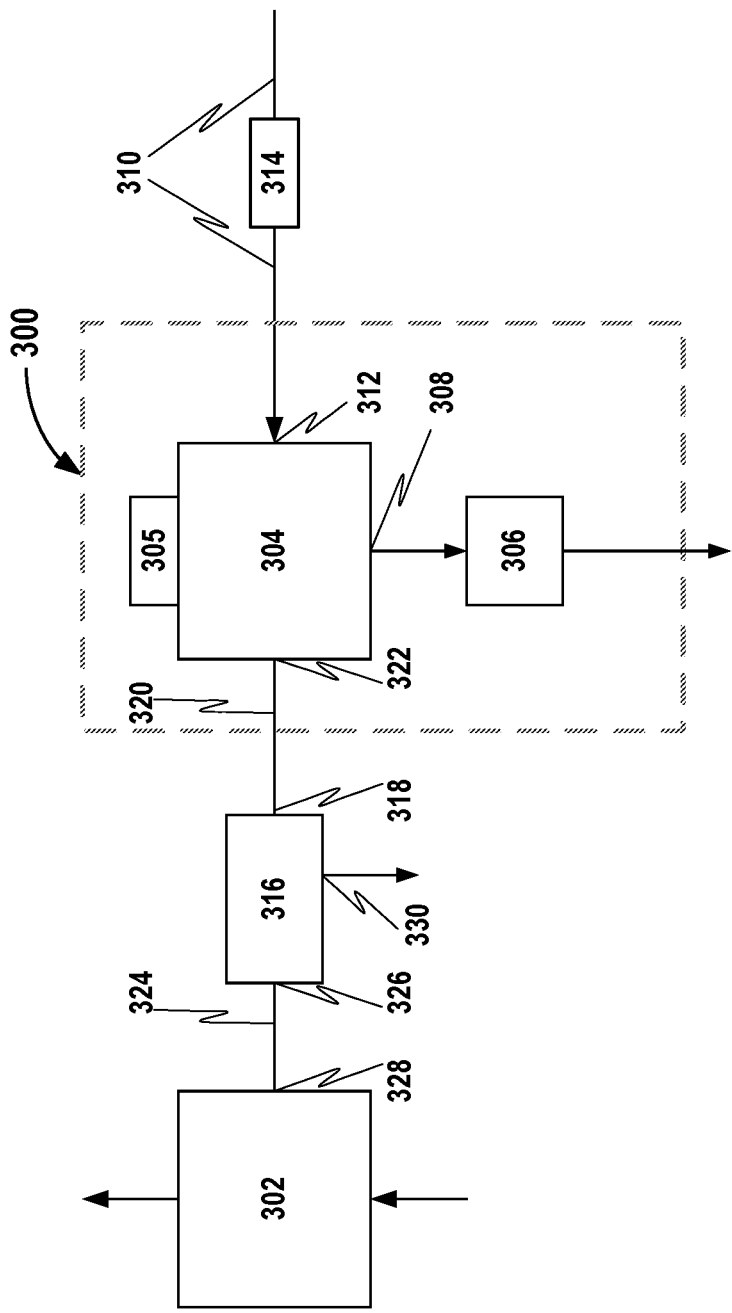
FIG. 3 schematically illustrates an electrically-operated, locally-actuated partial stroke testing device for testing a single acting emergency isolation valve, in accordance with various embodiments.

FIG. 3 schematically illustrates an electrically-operated, locally-actuated partial stroke testing device 300 for testing a single acting emergency isolation valve 302, in accordance with various embodiments. The device 300 includes a 3/2 solenoid valve 304 including an electrical actuator 305, where the valve is normally de-energized during periods in which the device 300 is not being used for PST of valve 302. The electrical actuator 305 may be a push button for example or some other type of actuator to provide an electrical signal to initiate a PST of valve 302. The device 300 can include a flow control valve 306 coupled to a vent port 308 of the 3/2 solenoid valve 304. The flow control valve 306 is used to restrict or allow air flow from the vent port 308. An air supply line 310 is used to provide air to an input port 312 of the 3/2 solenoid valve 304. The air supply line 310 can incorporate an air filter regulator 314 to filter and regulate air supplied to the input port 312. A second 3/2 solenoid valve 316 with a first port 318 is coupled via an air flow line 320 to a working port 322 of the 3/2 solenoid valve 304. In certain embodiments, the second 3/2 solenoid valve 316 is a universal type normally energized 3/2 solenoid valve with an exhaust port 330. The second 3/2 solenoid valve 316 is normally energized during periods in which the valve 302 is not undergoing PST. The device 300 can further include a working flow line 324 coupled between a second port 326 of the second 3/2 solenoid valve 316 and a port 328 of the single acting emergency isolation valve 302, where the working flow line 324 operates to provide bidirectional air flow. In certain embodiments, the device 300 can further include the flow control valve 306 integrated with the vent port of the 3/2 solenoid valve 304. The device 300 can further include an electrical actuator 305 and a PST limit switching circuit. This limit switch acts as an extra protective measure to indicate whether the valve 302 has moved to a particular location associated with successful partial stroke testing, such as the valve 302 being at a 80% or 90% open position.

Figure 4:
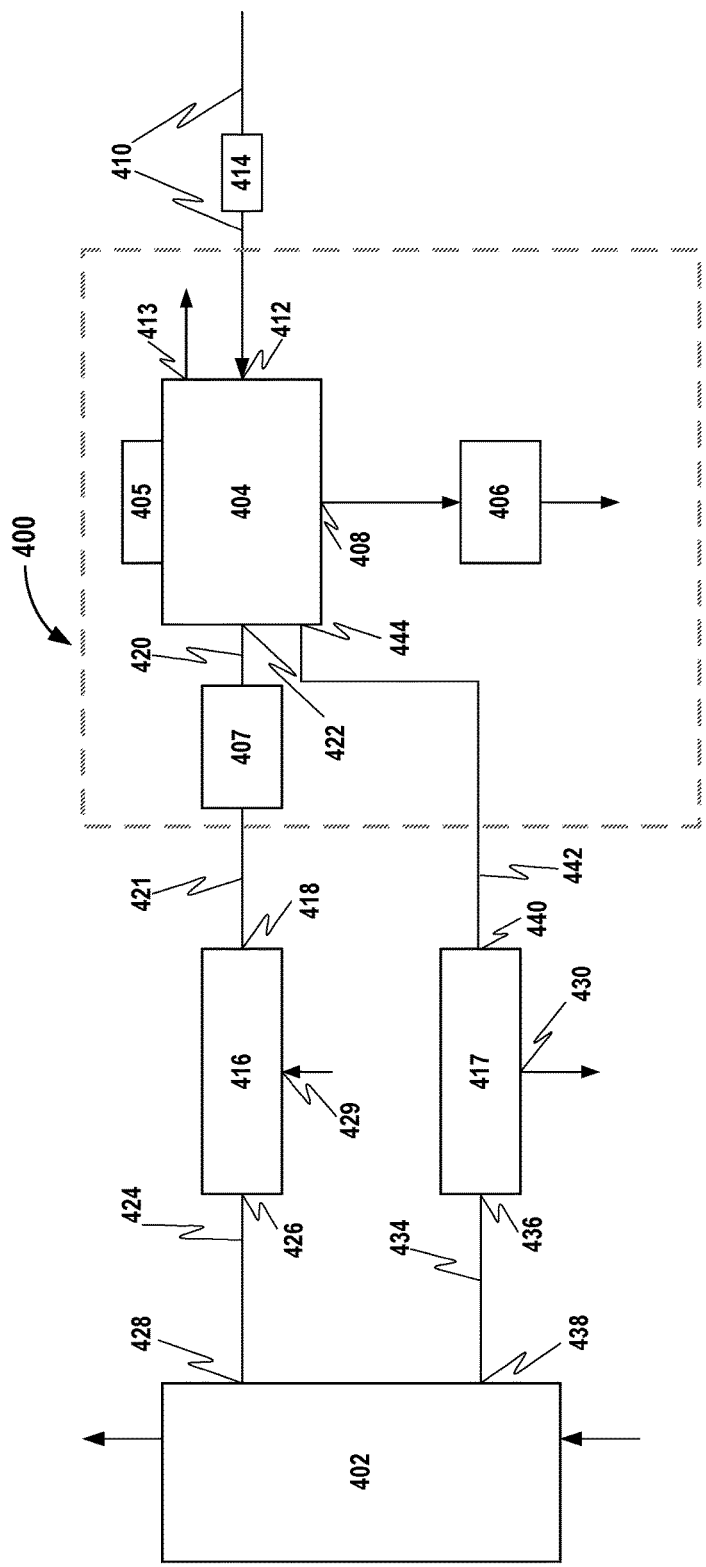
FIG. 4 schematically illustrates an electrically-operated, locally-actuated partial stroke testing device for testing a double acting emergency isolation valve, in accordance with various embodiments.

FIG. 4 schematically illustrates an electrically-operated, locally-actuated electrical partial stroke testing device 400 for testing a double acting emergency isolation valve 402, in accordance with various embodiments. The device 400 may include a 5/2 solenoid valve 404 having an electrical actuator 405 and a first vent port 408 and a second vent port 413. The first vent port 408 and second vent port 413 are provided to vent air from the 5/2 solenoid valve 404 and the valve is normally de-energized during periods when the valve 402 is not undergoing PST. The electrical actuator may be a push button for example or some other type of actuator to provide an electrical signal to initiate a PST of valve 402. The device 400 further includes a first flow control valve 406 coupled to the first vent port 408 of the 5/2 solenoid valve 404. The flow control valve 406 is used to restrict or allow air from the first vent port 408. The device 400 further includes a first flow control valve 406 coupled to the first vent port 408 of the 5/2 solenoid valve 404. The flow control valve 406 is used to restrict or allow air flow from the first vent port 408. An air supply line 410 is used to provide air to an input port 412 of the 5/2 solenoid valve 404. The air supply line 410 can include an air filter regulator 414 to filter and regulate air. A first 3/2 solenoid valve 416 with a first port 418 is coupled via a first working line 420 to a first working port 422 of the 5/2 solenoid valve 404. The first 3/2 solenoid valve 416 can be a universal type normally energized 3/2 solenoid valve and includes an air inlet port 429. The first working port 422 is operably coupleable to the second vent port 413 via positioning of an electrical actuator 405 of the 5/2 solenoid valve 404. The electrical actuator 405 may be a button or a switch or some other type of electrical device for operation of the 5/2 solenoid valve 404. The device 400 can include a second flow control valve 407 operating on the first working line 420 between the first working port 422 of the 5/2 solenoid valve 404 and the first port 418 of the first 3/2 solenoid valve 416. The second flow control valve 407 is used to restrict or allow air from first working port 422. A second working flow line 424 connects a second port 426 of the first 3/2 solenoid valve 416 with a first port 428 of a double acting emergency isolation valve 402. A second 3/2 solenoid valve 417 with a first port 440 is coupled to the device 400 via a third working line 442 to a second working port 444 of the 5/2 solenoid valve 404. In certain embodiments, the second 3/2 solenoid valve 417 is a universal type normally energized 3/2 solenoid valve and includes an exhaust port 430. The second working port 444 is operably coupleable to the first vent port 408 of the 5/2 solenoid valve via positioning of an electrical actuator 405. A fourth working flow line 434 connects a second port 436 of the second 3/2 solenoid valve 417 and a second port 438 of the double acting emergency isolation valve 402. The device 400 can further include the first flow control valve 406 integrated with the first vent port 408 of the 5/2 solenoid valve 404. The valve 404 may be manufactured with the flow control valve 406 as a design element of the valve 404 to provide an integrated valve with a flow controller. The device 400 can further include the second flow control valve 407 integrated with the first working port 422 of the 5/2 solenoid valve 404. The device 400 further may include a partial stroke testing limit switching circuit.

The various embodiments of the inventions, as set forth infra, are intended to be illustrative, and not limiting. As a result, it will be apparent for those skilled in the art that the illustrative embodiments described are only examples and that various modifications can be made within the scope of the invention as defined in the appended claims.

What is claimed is:

1. A locally-actuated partial stroke testing system for testing a single acting emergency isolation valve, comprising:
   a mechanically-operated valve;
   a flow control valve coupled to a vent port of the mechanically-operated valve, the flow control valve being operable to regulate air flow from the vent port;
   an air supply line coupled to an input port of the mechanically-operated valve, the air supply line having an air filter regulator to filter and regulate air supplied to the input port;
   a 3/2 solenoid valve with a first port coupled via an air flow line to a working port of the mechanically-operated valve;
   a working flow line coupled between a second port of the 3/2 solenoid valve and a port of the single acting emergency isolation valve, the working flow line providing bidirectional air flow; and
   a valve position indicator to convey position of the single acting emergency isolation valve, the valve position indicator and the mechanically-operated valve being in visual proximity to a user.

2. The system of claim 1, wherein the flow control valve is integrated to the vent port of the mechanically-operated valve.

3. The system of claim 1, wherein the mechanically-operated valve is a 3/2 manually-operated valve.

4. The system of claim 1, wherein the mechanically-operated valve is a 5/2 manually-operated valve.

5. The system of claim 1, wherein the valve position indicator conveys a percentage of diameter of the single acting emergency isolation valve open to fluid flow.

6. The system of claim 1, wherein the valve position indicator utilizes one or more of color, numerical, alphabetical, or graphical marks or combinations thereof to convey the percentage of diameter of the single acting emergency isolation valve open to fluid flow.

7. An electrically-operated, locally-actuated partial stroke testing device for testing a single acting emergency isolation valve, comprising:
   a 3/2 solenoid valve coupled to an electrical actuator;
   a flow control valve coupled to a vent port of the 3/2 solenoid valve, the flow control valve being operable to regulate air flow;
   an air supply line coupled to an input port of the 3/2 solenoid valve, the air supply line including an air filter regulator to filter and regulate air supplied to the input port;
   a second 3/2 solenoid valve with a first port coupled via an air flow line to a working port of the first 3/2 solenoid valve, the second 3/2 solenoid valve being a universal type 3/2 solenoid valve with an exhaust port;
   a working flow line coupled between a second port of the second 3/2 solenoid valve and a port of a single acting emergency isolation valve, the working flow line to provide bidirectional air flow; and
   a valve position indicator to convey position of the single acting emergency isolation valve, the valve position indicator and the 3/2 solenoid valve being in visual proximity to a user.

8. The device of claim 7, wherein the flow control valve is integrated with the vent port of the 3/2 solenoid valve.

9. The device of claim 7, wherein the electrical actuator includes a partial stroke testing limit switching circuit.

10. The device of claim 7, wherein the valve position indicator conveys a percentage of diameter of the single acting emergency isolation valve open to fluid flow.

11. The device of claim 7, wherein the valve position indicator utilizes one or more of color, numerical, alphabetical, or graphical marks or combinations thereof to convey the percentage of diameter of the single acting emergency isolation valve open to fluid flow.

* * * * *